United States Patent [19]

Hurst, Jr.

[11] Patent Number: 5,561,656
[45] Date of Patent: Oct. 1, 1996

[54] PULSE WIDTH MODULATION OPTICAL DISK DRIVE WITH PULSED LASER PREHEATING BETWEEN MARKS

[75] Inventor: Jerry E. Hurst, Jr., San Jose, Calif.

[73] Assignee: International Business Machines Corporation, Armonk, N.Y.

[21] Appl. No.: 342,196

[22] Filed: Nov. 18, 1994

[51] Int. Cl.[6] .................................................. G11B 7/00
[52] U.S. Cl. ..................... 369/124; 369/116; 369/275.1; 369/59
[58] Field of Search ............................. 369/13, 116, 160, 369/107, 124, 59, 275.1, 275.2; 347/225, 248

[56] References Cited

U.S. PATENT DOCUMENTS

| | | | |
|---|---|---|---|
| 4,473,829 | 9/1984 | Immink et al. | 346/1.1 |
| 4,488,277 | 12/1984 | McFarlane et al. | 369/48 |
| 4,774,522 | 9/1988 | Van Tongeren et al. | 346/1.1 |
| 4,866,692 | 9/1989 | Saito et al. | 369/59 |
| 4,873,680 | 10/1989 | Chung et al. | 369/59 |
| 4,998,237 | 3/1991 | Osakabe et al. | 369/109 |
| 5,289,453 | 2/1994 | Ohno et al. | 369/116 |
| 5,339,298 | 8/1994 | Saito | 369/13 |
| 5,345,434 | 9/1994 | Ide et al. | 369/124 |
| 5,400,313 | 3/1995 | Belser et al. | 369/116 |
| 5,463,600 | 10/1995 | Kirino et al. | 369/116 |

FOREIGN PATENT DOCUMENTS

0597656A2  5/1994  European Pat. Off. .......... G11B 7/00

Primary Examiner—Georgia Y. Epps
Assistant Examiner—Kim-Kwok Chu
Attorney, Agent, or Firm—Thomas R. Berthold

[57] ABSTRACT

A pulse width modulation (PWM) optical disk drive uses a modulator-controlled laser to emit the laser beam in a highly pulsed manner. The beam may be pulsed on any given write clock period and at any of several different power levels. The pulsed laser writes essentially circular submarks of substantially the same size on the disk when the power level is sufficiently high. The various PWM mark run-lengths are recorded on the disk either as a single isolated submark in the case of the shortest run-length or as a series of contiguous or overlapping submarks in the case of longer run-lengths. During the intervening PWM gap run-lengths the optical disk is preheated by a series of pulses at a power level below that which would write a submark on the disk. Both the number and duty cycle of these preheat pulses is varied depending on the length of the PWM gap run-length to ensure that the initial submark at the start of the subsequent PWM mark run-length is substantially the same size, regardless of the length of the preceding gap run-length. This ensures proper placement of the mark leading edges. When even finer control of the preheating is required, pattern-dependent gap preheat pulsing can be performed, wherein the number and duty cycle of the preheat pulses in the gap is varied depending not only on the length of the gap run-length but also the length of the preceding mark run-length.

18 Claims, 13 Drawing Sheets

PULSE WIDTH MODULATION OPTICAL DISK DRIVE WITH PULSED LASER PREHEATING BETWEEN MARKS

TECHNICAL FIELD

This invention relates in general to optical data storage disk drives, and in particular to a pulse width modulation (PWM) optical disk drive that allows accurate placement of PWM mark edges by control of laser pulse power and timing between marks.

BACKGROUND OF THE INVENTION

Optical disk drives provide for the storage of great quantities of data on a disk. The data is accessed by focusing a laser beam onto the data layer of the disk and then detecting the reflected light beam.

Magneto-optical (M-O) systems write data by directing a laser to a spot on the data layer to heat it above its Curie temperature while the magnetic domain of the spot is oriented in either an up or a down direction by an external magnetic field. The data is read by directing a low power laser to the data layer. The differences in magnetization direction of the spots cause the plane of polarization of the reflected light beam to be rotated either clockwise or counterclockwise. This change in orientation of polarization of the reflected light is then detected. Magnetic super resolution (MSR) M-O media operates in the same manner as conventional M-O media but uses at least two magnetically coupled magnetic layers and requires a much higher laser power to read the data. Direct overwrite (DOW) M-O media uses at least two magnetically coupled magnetic layers and allows erasure of data and writing of new data to occur in the same disk rotation.

Phase change systems write data by directing the laser to a spot on the data layer to cause a structural change of the data layer, typically from a crystalline phase to an amorphous phase. The data is detected as changes in reflectivity as the laser beam passes over the different phases. Alloying systems write data by the heating of two chemically distinct materials, such as $Bi_2Te_3$ and $Sb_2Se_3$, to form an amorphous alloy in the data layer. In alloying systems the data is detected as changes in reflectivity. Phase change media and alloying media are used as write-once read many (WORM) media.

In all of these types of systems the writing of data thus occurs due to laser heating of the material in the data layer.

Pulse width modulation (PWM) is one way to write data as marks on optical disks. In PWM, a mark can be either an individual spot (also called a submark) or a series of overlapping or contiguous submarks. PWM records information as the distance between the transitions or edges of the marks. A transition is either the beginning (leading) or end (trailing) edge of a mark. PWM recording is difficult to implement because the mark edges must be precisely positioned and written with sharp boundaries to ensure accurate recording. The thermal buildup that occurs within the data layer in the gaps between the trailing edges and leading edges of adjacent marks during the laser writing process can cause great distortions in the precise placement of the leading edges. Thermal buildup occurs when there is insufficient time between the writing of successive submarks in a mark to allow the data layer to cool prior to the writing of the next mark. Both an increase in disk drive data rate and an increase in linear data density on the disk are causes for the insufficient cooling time. In addition to this problem of thermal preheating caused by thermal buildup, the gap may be so long that there is excessive cooling of the data layer so that the data layer does not reach the required temperature at the precise time to write the submark forming the leading edge of the next mark. In PWM writing the gap lengths also vary so the effect of thermal preheating and cooling on placement of the subsequent mark leading edges depends on the type of mark previously written as well as the length of the gap. Under these conditions of thermal preheating or cooling of the data layer caused by the prior write history, errors occur in the placement of the leading edges of marks. The problem of precise placement of mark edges becomes more significant as the linear density of the submarks increases and the spacing between the submarks decreases because the peak temperature of the thermal interaction in the data layer increases. In addition, each type of optical media has its own thermal characteristics so the problems of thermal preheating and cooling will vary depending on the type of media being used.

What is needed is a PWM optical disk drive that reliably writes marks on the disk so that the mark edges are precisely aligned without the adverse effect of thermal preheating or cooling, regardless of the prior pattern of written marks and gaps.

SUMMARY OF THE INVENTION

The invention is a PWM optical disk drive that uses a modulator-controlled laser to emit the laser beam in a highly pulsed manner. The beam may be pulsed on any given write clock period and at any of several different power levels. The pulsed laser writes essentially circular submarks of substantially the same size on the disk when the power level is sufficiently high. The various PWM mark run-lengths are recorded on the disk either as a single isolated submark in the case of the shortest run-length or as a series of contiguous or overlapping submarks in the case of longer run-lengths. During the intervening PWM gap run-lengths the optical disk is preheated by a series of pulses at a power level below that which would write a submark on the disk. Both the number and duty cycle of these preheat pulses is varied depending on the length of the PWM gap run-length to ensure that the initial submark at the start of the subsequent PWM mark run-length is substantially the same size, regardless of the length of the preceding gap run-length. This ensures proper placement of the mark leading edges. When even finer control of the preheating is required, pattern-dependent gap preheat pulsing can be performed, wherein the number and duty cycle of the preheat pulses in the gap is varied depending not only on the length of the gap run-length but also the length of the preceding mark run-length.

For a fuller understanding of the nature and advantages of the present invention, reference should be made to the following detailed description taken into conjunction with the accompanying drawings.

DESCRIPTION OF THE PREFERRED EMBODIMENTS

Overview of the Optical Disk Drive

Figure 1:
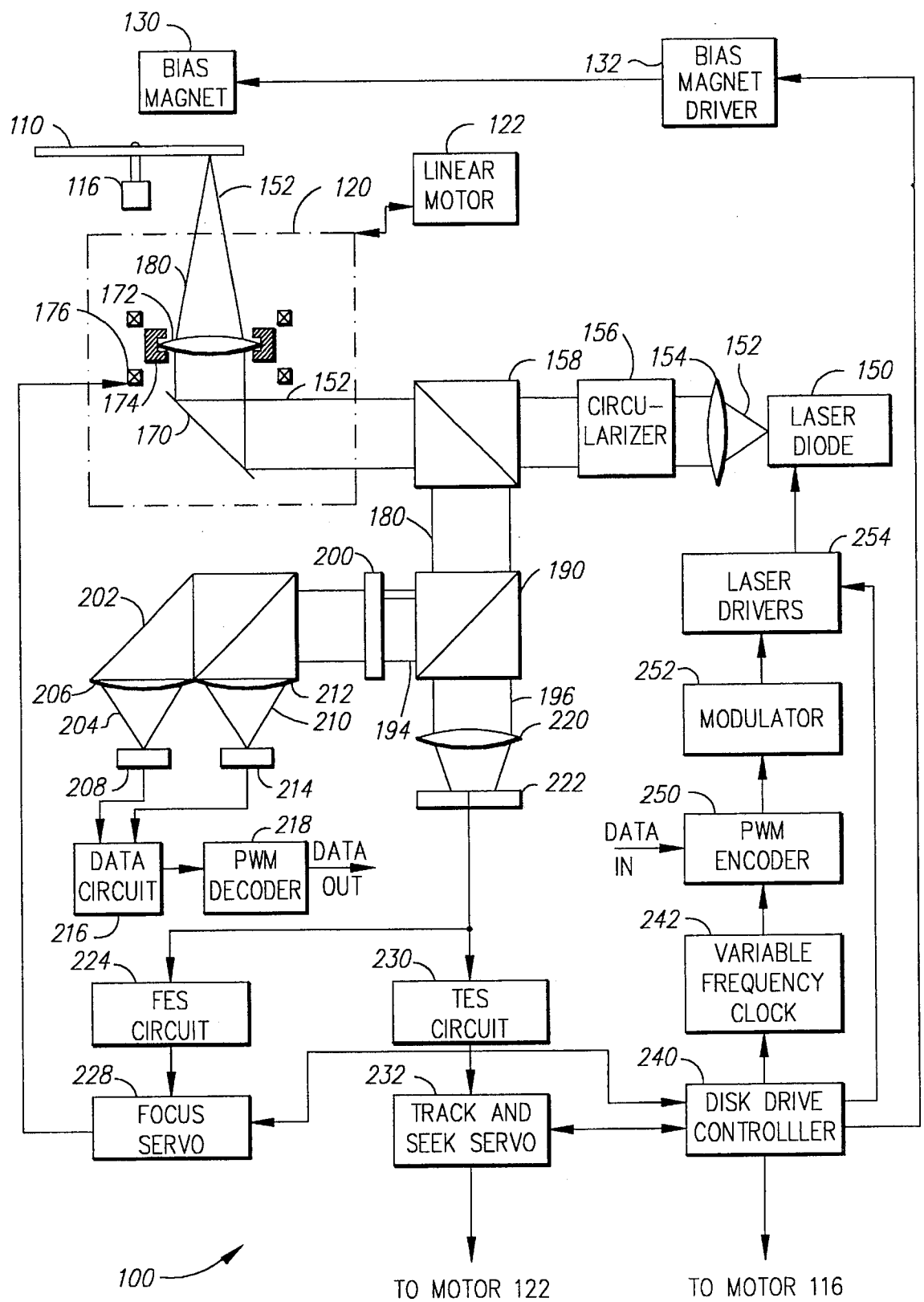
FIG. 1 is a block diagram of the optical disk drive according to the present invention.

A diagram of an optical disk drive according to the present invention is shown in FIG. 1. The disk drive 100 uses an optical disk 110 that may be a standard M-O disk, an MSR M-O disk, a DOW M-O disk, or a WORM disk. In the embodiment described with respect to FIG. 1 disk 110 is a standard M-O disk. Disk 110 is mounted to a spindle motor 116. An optical head 120 that directs and focuses a polarized light beam 152 from laser 150 is positioned below disk 110. The beam 152 is focused to a spot on disk 110 on a data track. Head 120 and thus laser beam 152 is movable in a radial direction to different data tracks on disk 110 by a linear motor 122. A bias magnet 130 is located above disk 110 and is connected to a bias magnet driver 132. Bias magnet 130 reorients the magnetic transitions on the M-O data layer on disk 110 when the M-O data layer is heated by the light beam 152.

Laser diode 150 produces a polarized light beam 152. Any type of laser may be used, however, laser 150 is preferably a 685 nm diode laser. Light beam 152 is collimated by a lens 154 and circularized by a circularizer 156, which is preferably a prism.

Beam 152 then passes through a beamsplitter 158 to a mirror 170. Mirror 170 reflects the light beam 152 toward a focusing lens 172. Lens 172 focuses the light beam 152 onto the disk 110. Lens 172 is mounted in a lens holder 174. Holder 174 is movable in the axial direction relative to disk 110 by an actuator motor 176. Mirror 170, lens 172, holder 174 and motor 176 are preferably located in the optical head 120.

As a result of light beam 152 striking the disk 110, a light beam 180 is reflected from disk 110. Reflected light beam 180 passes back through lens 172 and is reflected by mirror 170. A portion of light beam 180 is then reflected by beamsplitter 158 to a second beamsplitter 190. Beamsplitter 190 divides the reflected light beam 180 into a data beam 194 and a servo beam 196.

Data beam 194 passes through a half waveplate 200 to a polarizing beamsplitter 202. Polarizing beamsplitter 202 divides beam 194 into orthogonal polarization components. A first polarization component beam 204 is focused by a lens 206 to a data detector 208 and a second polarization component 210 is focused by a lens 212 to a data optical detector 214. A data circuit 216 is connected to detectors 208 and 214, and generates a pulse width modulation (PWM) data signal representative of the pattern of transitions recorded on disk 110. Data circuit 216 is connected to a PWM decoder 218 that converts the PWM signal to a digital data signal.

Servo beam 196 is focused by a lens 220 onto a segmented optical detector 222, such as a spot size measuring detector as is known in the art. A focus error signal (FES) circuit 224 is connected to detector 222. A focus servo 228, as is known in the art, is connected to FES circuit 224 and motor 176. Servo 228 controls motor 176 to adjust the position of lens 172 as appropriate in order to maintain proper focus. A tracking error signal (TES) circuit 230 is also connected to detector 222. A track and seek servo 232, as is known in the art, is connected to TES circuit 230 and motor 122. Servo 232 causes motor 122 to adjust the position of head 120 and thus light beam 152 radially relative to disk 110.

Figure 2:
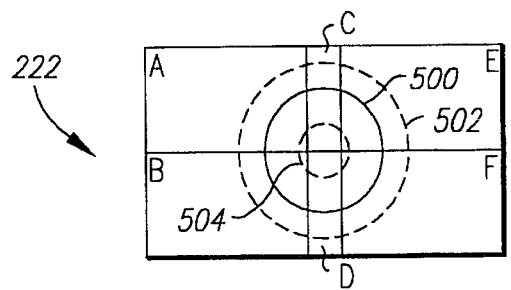
FIG. 2 is a top view of the optical detector shown in FIG. 1 for generating focus, tracking and data signals.

FIG. 2 shows a top view of detector 222. Detector 222 is divided into six sections, 222A, 222B, 222C, 222D, 222E and 222F.

Figure 3:
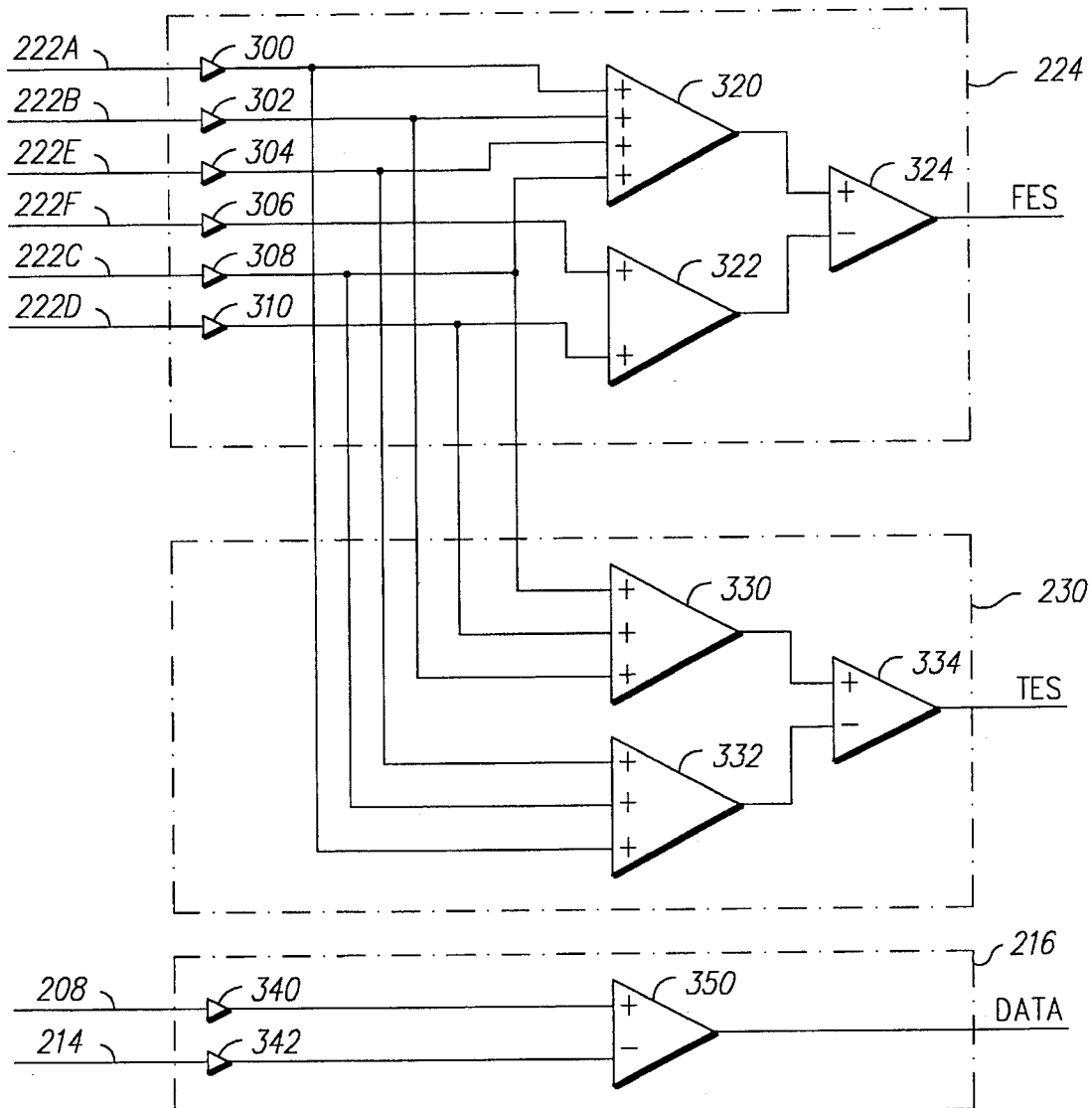
FIG. 3 is a diagram of the circuits for the focus error signal, tracking error signal and data signal.

FIG. 3 shows a circuit diagram of the FES circuit 224, the TES circuit 230, and the data circuit 216.

FES circuit 224 comprises a plurality of amplifiers 300, 302, 304, 306, 308 and 310 connected to detector sections 222A, 222B, 222E, 222F, 222C and 222D, respectively. A summing amplifier 320 is connected to amplifiers 300–306 and a summing amplifier 322 is connected to amplifiers 308 and 310. A differential amplifier 324 is connected to summing amplifiers 320 and 322 and generates the FES.

TES circuit 230 comprises a pair of summing amplifiers 330 and 332, and a differential amplifier 334. Amplifier 330 is connected to amplifiers 302, 306 and 310, and amplifier 332 is connected to amplifiers 300, 304 and 308. Differential amplifier 334 is connected to amplifiers 330 and 332 and generates the TES.

Data circuit 216 includes amplifiers 340 and 342 connected to detectors 208 and 214, respectively. A differential amplifier 350 is connected to amplifiers 340 and 342, and generates the PWM data output signal representative of the marks recorded on the disk 110.

Referring again to FIG. 1, a disk drive controller 240, as is known in the art, is connected to and provides overall control for focus servo 228, track and seek servo 232, spindle motor 116, magnet driver 132, laser driver 254, and a variable frequency clock 242. Controller 240 adjusts the clocking speed of the clock 242 as appropriate depending upon the position of head 120. The clock 242 generates timing signals with a characteristic clock cycle time, Tc, and controls the timing of data reading and writing in the disk drive. Variable frequency clock 242, also called a frequency synthesizer, is well known in the art. The spindle motor 116 is controlled to spin at a constant angular velocity and the linear velocity of light beam 152 relative to disk 110 will vary depending upon the radial position of head 120.

Clock 242 is connected to a PWM encoder 250. Encoder 250 receives a digital data signal from the host computer and encodes it into the desired PWM code. In the preferred embodiment, encoder 250 is a (1,7) run-length limited (RLL) PWM encoder. PWM encoders are well known in the art and implement a variety of PWM codes. An example of a (1,7) encoder is described in IBM's U.S. Pat. No. 4,488, 142 and an example of a (2,7) encoder is described in IBM's U.S. Pat. No. 3,689,899. Encoder 250 is connected to a modulator 252. Modulator 252 receives the PWM code and causes the laser 150, via the laser driver 254, to write the desired data patterns onto the data layer of disk 110.

The operation of disk drive 100 will now be explained. During the write operation the encoder 250, with its timing controlled by clock cycles from clock 242, encodes the digital data from the host computer into a PWM (1,7) RLL encoded digital data signal. This encoded data signal is sent to the modulator 252 which converts it into instructions to the laser driver 254 for writing the desired pulsed pattern according to the present invention. The laser 150 is pulsed (from threshold level to the higher write levels) responsive to the laser driver 254 and provides a pulsed light beam 152 at the desired power levels. Beam 152 is powerful enough to heat the data layer of disk 110 to above its Curie temperature. At this temperature, the data layer of disk 110 may be magnetically aligned in either an up or down direction. Disk 110 is initially magnetically aligned in a first direction. Controller 240 causes magnet control 132 to energize magnet 130 in the opposite direction to that of the disk. The desired data pattern is then recorded on the disk as changes in magnetic domain orientations.

As shown in FIG. 2, when beam 152 is exactly focused on disk 110, servo beam 196 will have a circular cross section 500 on detector 222. The sum of the amount of light hitting areas C and D will be approximately equal to the sum of the amount of light hitting areas A, B, E and F, which will cause FES circuit 224 to generate a zero FES. If beam 152 is slightly out of focus one way or the other, beam 196 will have a circular cross section 502 or 504 on detector 222. This change in circular cross section causes circuit 224 to generate a positive or negative FES. The FES is used by the focus servo 228 (FIG. 1) to control motor 176 to move lens 172 until focus is again achieved.

If beam 152 is focused exactly on a track of disk 110, then servo beam 196 will fall as a circular cross section 500 equally between the sections A, C and E, and the sections B, D and F. If beam 152 is off track, beam 196 will fall more on sections A, C and E, and less on sections B, D and F, or vice versa. This will result in a positive or negative TES being produced by TES circuit 230. This TES is then used by the track and seek servo 232 (FIG. 1) to control motor 122 to adjust head 120 radially on disk 110 until the beam 152 is once again on track.

During a read operation, controller 240 causes laser driver 254 to energize laser 150 to generate the low power read level beam 152. Beam 152 hits disk 110. The low power beam does not heat disk 110 to above its Curie temperature. The reflected light 180 has its plane of polarization rotated one way or the other depending upon the magnetic domain orientations of the spots on the disk 110. These differences in polarization are detected by detectors 208 and 214, and data circuit 216 outputs a PWM data signal to PWM decoder 218 that converts the signal back to a digital data signal.

PWM RLL Encoding Data Patterns with Pulsed Preheating

PWM recording uses the distance between transitions of recorded runs to encode digital data. The length between transitions contains the information of the digital data. There are many different encoding schemes known in the art which may be used to encode digital data into PWM marks and gaps. The most popular type of encoding schemes use run-length limited (RLL) codes. These RLL codes use a small set of run-lengths, which when used in different combinations, encode any pattern of digital data. A run-length is defined as either a) the distance between the leading edge of a mark, or series of connecting submarks, and the trailing edge of the mark (i.e., the mark "run-length"), or b) the distance between the trailing edge of a mark run-length and the leading edge of the subsequent mark run-length (i.e., the gap run-length). RLL codes are defined in units of code clock cycles Tc. In disk drive systems this time period Tc corresponds to the code bit length, Lc, which is the linear distance the disk rotates in the time period Tc. The RLL codes are designated in the form (d-1, k-1), where d is the minimum run-length (in time periods Tc) and k is the maximum run-length (in time periods Tc). For example, a (1,7) RLL code has a minimum run-length of 2Tc and a maximum run-length of 8Tc. In the application of PWM recording to optical recording disk drives, the mark run-lengths are formed by local heating of the disk resulting from absorption of laser radiation. The gap run-lengths correspond to the spaces or gaps between successive mark run-lengths.

Figures 4A, 4B:
FIGS. 4A and 4B are schematic diagrams illustrating a preferred embodiment of the laser beam pulse sequences for each of the mark run-lengths and gap run-lengths, respectively, allowed by the d,k constrained (1,7) RLL code.
Figure 5:
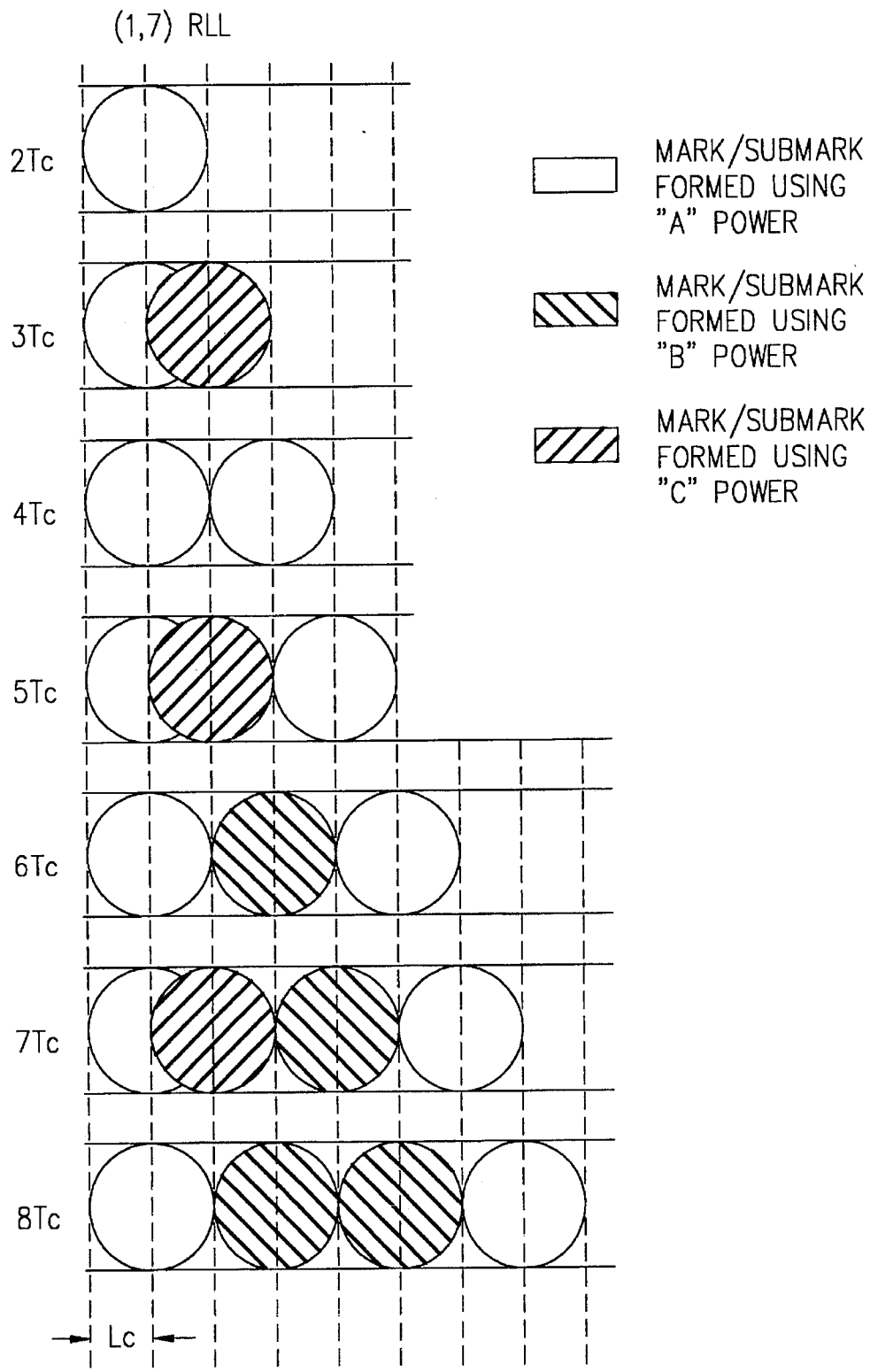
FIG. 5 is a schematic diagram illustrating the (1,7) mark run-lengths generated when the laser is pulsed as in FIG. 4A.

The technique of accurately forming leading and trailing edge submarks is called edge writing and a complete description of the laser pulsing pattern (laser irradiation profile) required to generate all the mark and gap run-lengths required by a particular code is called an edge writing algorithm for that particular code. For example, FIGS. 4A and 4B illustrate an edge writing algorithm for a (1,7) RLL code. The written pattern, as shown in FIG. 5, uses the absolute minimum number of circular marks to write the desired mark run-lengths. Where the submarks must overlap by Lc, as in the 5Tc mark run-length, the second submark is written at a reduced power level. Where there are three or more submarks, and an overlap must occur, as in the 7Tc mark run-length, the overlap does not occur on the trailing edge circular submark. This helps ensure that the trailing edge, which is most susceptible to the thermal buildup, will be accurately positioned. As a special case the 3Tc mark run-length, which is comprised of two circular submarks, utilizes a special power level C to ensure that this mark run-length is accurately written.

FIGS. 4A–4B show a schematic diagram of the recording pattern (laser irradiation profile) of the present invention that implements a (1,7) RLL code and that uses preheat pulses between writing pulses and during the gap run-lengths. This profile is intended for use in standard M-O recording systems but is extendable with minor modifications to other optical recording systems such as those that use WORM, DOW M-O and MSR media. The code is a set of mark run-lengths (FIG. 4A) and gap run-lengths (FIG. 4B) of 2Tc to 8Tc. The laser can be pulsed to any of four discrete power levels above the threshold level (these power levels are designated as A, B, C, and P in FIGS. 4A–4B), where $A \geq B \geq C > P$. During the periods of writing when the laser is not at the A, B, C, or P power level, it is operating at a "tracking" power level which is as low as possible. In the preferred embodiment the laser current during this time is equal to the threshold current for lasing and the laser power is less than 0.5 mW. Laser pulses at power levels A, B, and C are of sufficient intensity to produce substantially circular marks in the optical disk during laser irradiation and as such are referred to as writing pulses. Laser pulses at power level P are not of sufficient intensity to produce marks in the optical disk and as such are referred to as preheat pulses since they serve only to locally heat the disk. In optical disk drives, the time duration of the writing pulse is as short as possible and typically around 10–20 ns. It is usually selected to be between approximately 30% of Tc at the disk innermost track and 60% of Tc at the disk outermost track. In the preferred embodiment Tc=35 ns at the disk innermost track and Tc=17.5 ns at the disk outermost track. Both the number and duty cycle of the preheat pulses is variable. The duty cycle spans the range between 0% and 100% of Tc. In the preferred embodiment the P pulse width is selectable among discrete values of 0%, 50%, and 100% of Tc to simplify the circuitry needed to modulate the laser. These discrete values of P pulse width provide sufficient flexibility in preheat to ensure adequate edge placement regardless of the particular gap run-length.

As shown in FIG. 4A for the case of a (1,7) RLL code, mark run-lengths are formed by either an isolated A laser pulse in the case of a 2Tc mark run-length or the combination of an A laser pulse with A, B, C, and/or P pulses in the case of longer mark run-lengths. The submark patterns for mark run-lengths generated on the optical disk by the laser pulse profiles shown in FIG. 4A is shown in FIG. 5. The laser power level A is adjusted so that the 2Tc mark is the correct length. As is known in conventional disk drives, this is done during the drive's laser power calibration routine by writing a predetermined data pattern and then measuring the read-back signal amplitude by one of several known techniques. The calibration is typically performed at disk drive start-up and/or at periodic intervals during drive operation.

Mark run-lengths >2Tc require at least two laser pulses: an A laser pulse to form the leading edge submark and either a C pulse (in the case of the 3Tc mark run-length) or an A pulse (in the case of mark run-lengths greater than 4Tc) to form the trailing edge submark. The power level C is adjusted so that the 3Tc mark is the correct length. This C pulse is required because thermal preheating of the optical disk by the preceding A pulse would otherwise cause the trailing edge submark of the 3Tc mark run-length to be positioned beyond its desired precise location on the disk. The pulses used to write leading and trailing edge submarks are called "edge" writing pulses. Each of the edge writing pulses forms a substantially circular submark of length 2Lc on the optical disk. Whenever the mark run-length is greater than 4Tc (i.e., the length of two contiguous submarks formed by successive leading and trailing edge writing pulses), additional write pulses are required. These additional pulses are called "filler" writing pulses because they are used to write filler submarks connecting the leading and trailing edge submarks. When the difference between the particular mark run-length (mark run-lengths are designated in integral numbers of clocks as mTc where m is an integer) and 4Tc is an odd number of code clocks, i.e. whenever (m-4) is odd and m>4, then a C filler pulse is used to form a submark that overlaps the leading edge submark by Lc. This is shown for the 5Tc and 7Tc mark run-lengths in FIG. 5. In addition, when (m-4) is even and m>4, (m-4)/2 B filler pulse(s) are used to form contiguous submarks contiguous with the leading and trailing edge submarks. This is shown for the 6Tc and 8Tc mark run-lengths in FIG. 5. The power level B is adjusted so that the 8Tc mark is the correct length. This B pulse is required because thermal preheating of the optical disk by a series of preceding filler pulses would otherwise cause the trailing edge submark of the 8Tc mark run-length to be positioned beyond its desired precise location on the disk. Finally, when m>4 both the trailing edge pulse and any B level filler pulses are immediately preceded by a P preheat pulse of duration 0.5Tc. This is shown in FIG. 4A.

The preheat pulses shown in FIGS. 4A–4B serve two purposes. First, when writing mark run-lengths (FIG. 4A) they increase the ambient temperature of the optical disk, which reduces the power required in the A, B, and C writing pulses. This is accomplished by applying preheat pulses on all write clocks which do not have a writing pulse, i.e. during all clocks of a gap run-length and during clocks of a mark run-length which do not have an A, B, or C writing pulse. In the prior art, a continuous low level laser power is applied to the media at a laser power level called the tracking level, which is typically 1.5 mW. In the present invention, the laser power is applied only on clocks where no writing pulse occurs and then as discrete preheat pulses of length 0.5Tc at the P power level, which is set at the minimum level required to provide adequate preheating, i.e., approximately 2 mW.

The second purpose served by the preheat pulses is that during the gap run-lengths (FIG. 4B) they control the ambient temperature of the optical disk during the subsequent leading edge writing pulse of a mark run-length. This control is required to compensate for the effect of preheating of the optical disk by the immediately preceding trailing edge writing pulse. This is accomplished by varying the amount of preheat (duty cycle of the preheat pulses) applied in each gap run-length as shown in FIG. 4B. First, preheat pulses are omitted during the last write clock in all mark run-lengths (see dashed "pulses" representing omitted preheat pulses in FIG. 4A). This allows the optical disk to rapidly cool after the trailing edge writing pulse. Second, as shown in FIG. 4B, preheat pulses are either omitted (0% duty cycle) as in the case of 2Tc and 3Tc gap run-lengths or extended (100% duty cycle) as in the case of 7Tc and 8Tc gap run-lengths. This ability to vary the duty cycle of the preheat pulses allows tailoring of the preheating to each gap run-length to ensure that the subsequent leading edge writing pulse forms the leading edge submark at the proper precise position on the optical disk. The specific preheat pulse patterns shown in FIGS. 4A–4B represent patterns that are appropriate for most current M-O media. The exact number and placement of added or deleted preheat pulses is adjusted for a particular media to ensure accurate mark and gap run-lengths. Examples of extending this procedure to other media types will be shown and explained in FIGS. 8A–8B and 9 for WORM media and in FIGS. 10A–10B and 11 for DOW M-O media.

While in the preheat pulsing example as described and shown in FIG. 4B, there is only one preheat pulsing pattern for each gap run-length, it may also be desirable to provide multiple preheat pulsing patterns for each gap run-length, where the specific pattern is selected based on the run-length of the mark just preceding the gap. This is because each mark run-length (such as those shown in FIG. 4A) may result in a slightly different temperature in the media immediately following the writing of the last submark in the mark. With this type of gap preheat pulsing, dependent on the specific pattern preceding the gap, the location of the leading edge of the next mark can be further optimized.

In the preferred embodiment of the present invention as explained above, a (1,7) RLL code is used and only the 2Tc–8Tc run-lengths are needed. However, the present invention can be used with any number of (d,k) RLL codes.

Figure 6B:
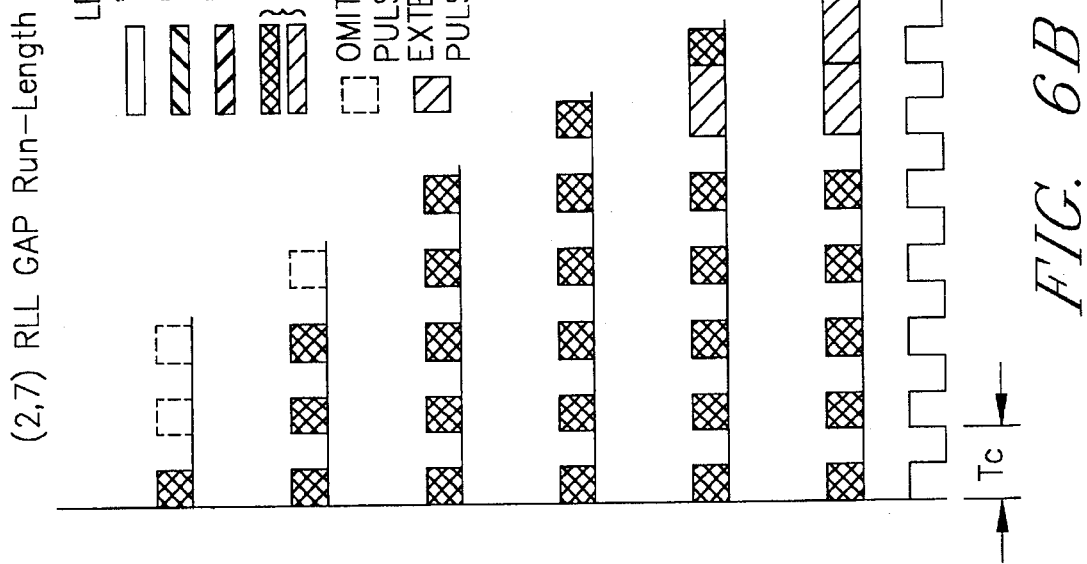
FIGS. 6A and 6B are schematic diagrams illustrating a preferred embodiment of the laser beam pulse sequences for each of the mark run-lengths and gap run-lengths, respectively, allowed by the d,k constrained (2,7) RLL code.
Figure 6A:
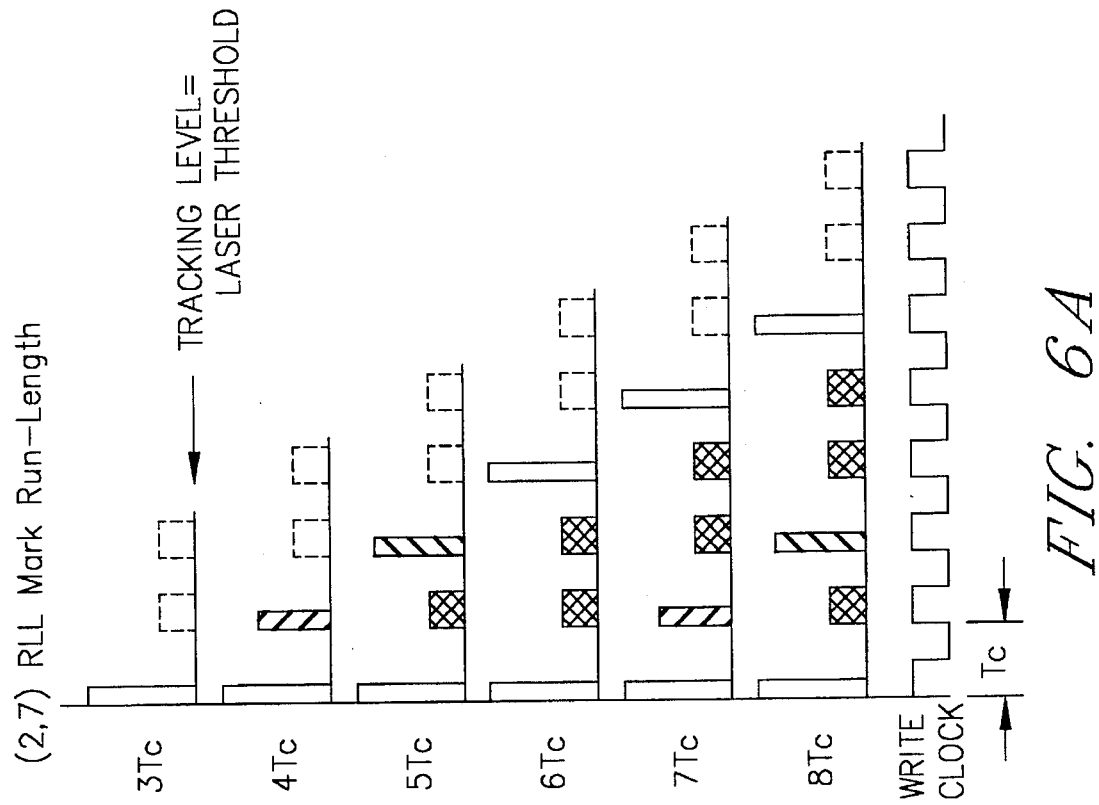

For example, FIGS. 6A–6B show a schematic diagram of the recording pattern (laser irradiation profile) of the present invention that implements a (2,7) RLL code. This profile is intended for use in standard M-O recording systems but is extendable with minor modifications to other optical recording systems such as those that use WORM, DOW M-O and MSR media. The code is a set of mark run-lengths (FIG. 6A) and gap run-lengths (FIG. 6B) of 3Tc to 8Tc. The laser can be pulsed to any of four discrete power levels above the threshold level (these power levels are designated as A, B, C, and P in FIGS. 6A–6B), where $A \geq B \geq C > P$.

Figure 7:
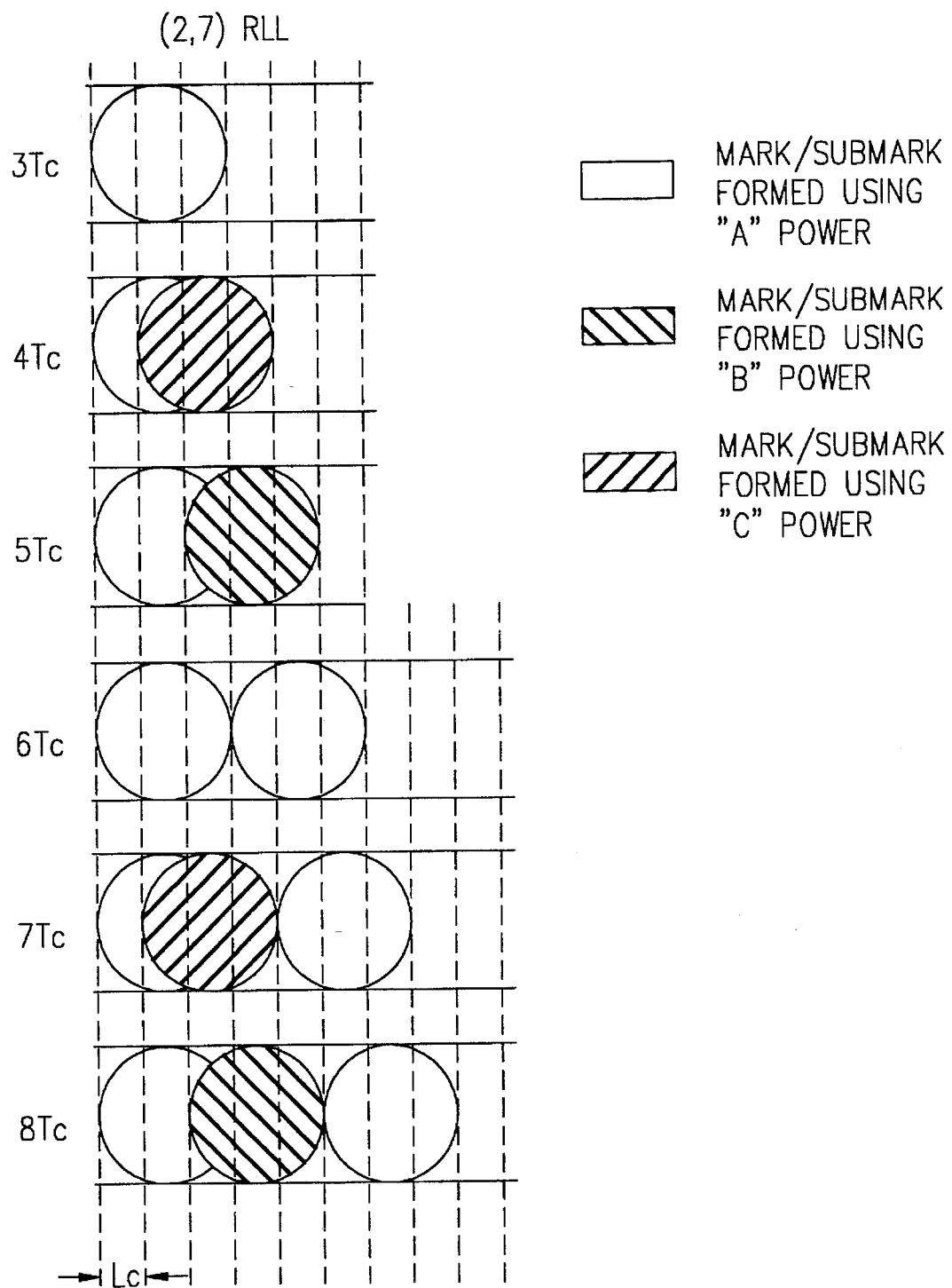
FIG. 7 is a schematic diagram illustrating the (2,7) mark run-lengths generated when the laser is pulsed as in FIG. 6A.

As shown in FIGS. 6A–6B for the case of a (2,7) RLL code, mark run-lengths are formed by either an isolated A laser pulse in the case of a 3Tc mark run-length or the combination of an A laser pulse with A, B, C, and/or P pulses in the case of longer mark run-lengths. The submark patterns for mark run-lengths generated on the optical disk by the laser pulse profile in FIG. 6A is shown in FIG. 7. The power level A is adjusted so that the 3Tc mark is the correct length. Mark run-lengths >3Tc require at least two laser pulses: an A laser pulse to form the leading edge submark and either a C pulse (in the case of the 4Tc mark run-length), a B pulse (in the case of the 5Tc mark run-length), or an A pulse (in the case of mark run-lengths $\geq$6Tc) to form the trailing edge submark. The power level C is adjusted so that the 4Tc mark is the correct length and the power level B is adjusted so that the 5Tc mark is the correct length. These B and C pulses are required because thermal preheating of the optical disk by the preceding A pulse would otherwise cause the trailing edge submark of the 4Tc and 5Tc mark run-lengths, respectively, to be positioned beyond their desired precise location on the disk. Each of these edge writing pulses forms a substantially circular submark of length 3Lc on the optical disk. Whenever the mark run-length is greater than 6Tc (i.e. the length of two contiguous submarks formed by successive leading and trailing edge writing pulses), additional write pulses are required. When the difference between the particular mark run-length and 4Tc is a multiple of 3 clocks, i.e. (m-4)/3=n where m$\geq$4 and n is an integer, then a C writing pulse is used to form a submark that overlaps the leading edge submark by 2Lc, as shown for the 4Tc and 7Tc mark run-lengths in FIG. 7. In addition, when (m-5) is multiple of 3, i.e. (m-5)/3=n where m$\geq$5 and n is an integer, then a B writing pulse is used to form a submark that overlaps the leading edge submark by Lc, as shown for the 5Tc and 8Tc mark run-lengths in FIG. 7. Finally, when m$\geq$5, A trailing edge writing pulses are immediately preceded by two P preheat pulses of duration 0.5Tc (6Tc, 7Tc and 8Tc mark run-lengths in FIG. 6A) and B writing pulses are immediately preceded by one P preheat pulse of duration 0.5Tc (8Tc mark run-length in FIG. 6A).

The preheat pulses shown in FIGS. 6A–6B serve the same purposes described above. Gap run-length dependent preheating is accomplished by varying the amount of preheat (duty cycle of the preheat pulses) applied in each gap run-length, as shown in FIG. 6B. First, preheat pulses are omitted during the last two write clocks in all mark run-lengths which permits the optical disk to rapidly cool after the trailing edge writing pulse. Second, as shown in FIG. 6B, preheat pulses are either omitted (0% duty cycle) as in the case of 3Tc and 4Tc gap run-lengths or extended (100% duty cycle) as in the case of 7Tc and 8Tc gap run-lengths. This permits tailoring of the preheat to each gap run-length to ensure that the subsequent leading edge writing pulse forms the correct leading edge submark at the proper precise position on the optical disk.

Figure 8:
FIGS. 8A and 8B are schematic diagrams illustrating a preferred embodiment of the laser beam pulse sequences for each of the mark run-lengths and gap run-lengths, respectively, allowed by the d,k constrained (1,7) RLL code applicable to slow-cooling WORM optical media.
Figure 9:
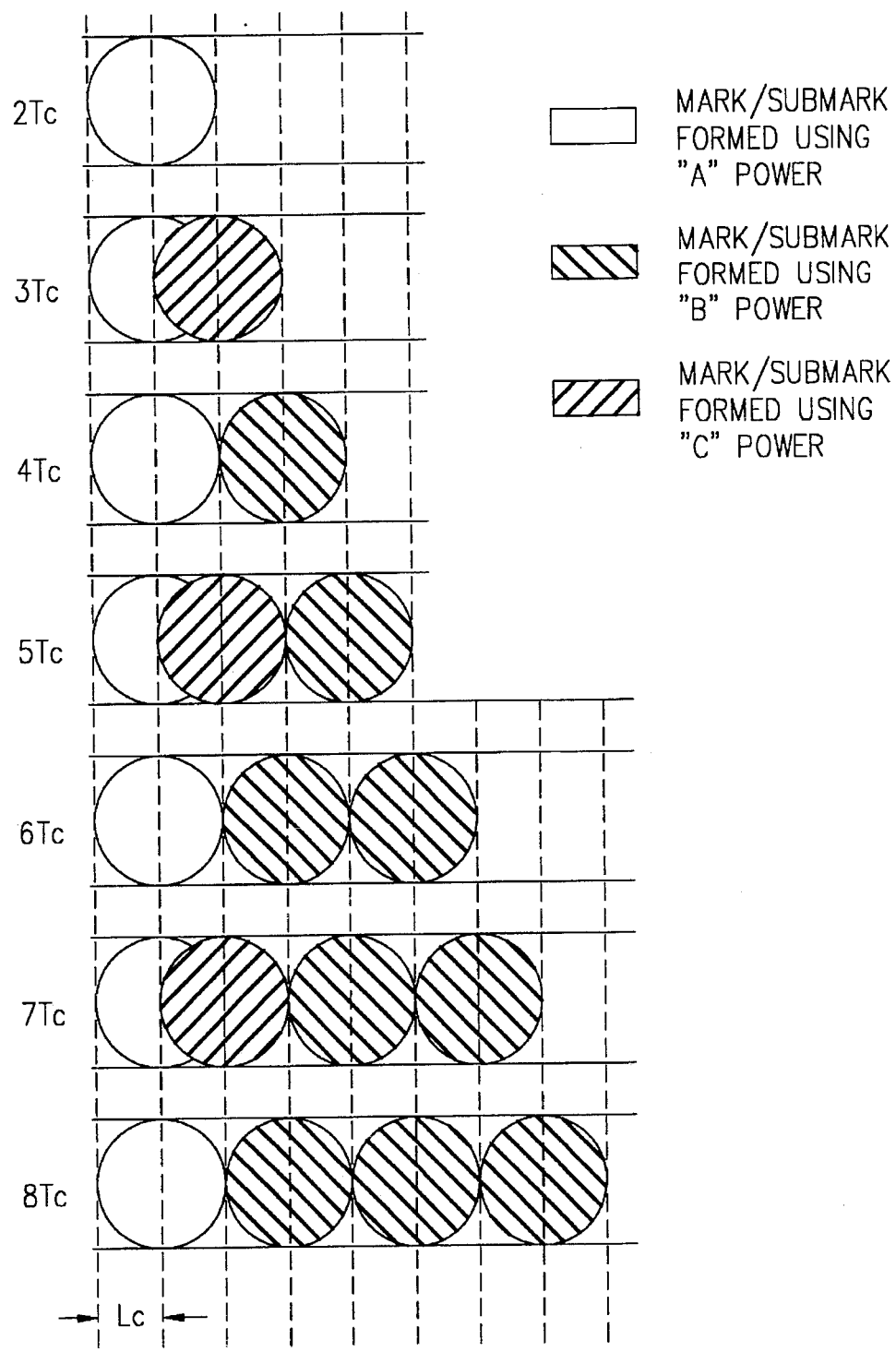
FIG. 9 is a schematic diagram illustrating the (1,7) mark run-lengths generated when the laser is pulsed as in FIG. 8A.

FIGS. 8A–8B and 9 illustrate a (1,7) RLL edge writing algorithm and the resulting mark/submark pattern applicable to a phase change type WORM optical disk. This disk can be characterized by strong short range thermal interactions between adjacent submarks. This is shown in FIG. 8A for the 3Tc mark where the A power level pulse is followed immediately by a C power level pulse. Thus the C power level for this disk is significantly less than the C power level for the M-O disk. The phase change WORM disk is also characterized by very little thermal interaction in the gaps between marks. Hence, the P preheat pulses in the mark run-lengths are used only to reduce the power levels required for the writing pulses; i.e. the A, B, and C power levels. A filler writing pulse at the C power level is used on the second clock of all odd mark run-lengths to compensate for the strong short range thermal interaction with the leading edge writing pulse of the odd mark run-lengths. The C power level is chosen such that the 3Tc mark run-length is written correctly. Likewise, because there is very little thermal interaction, a B pulse is used for all filler and trailing edge writing pulses for mark run-lengths greater than 3Tc. The B power level is a 2Tc extension pulse because it extends the length of any prior mark by 2Tc when written contiguously with the preceding writing pulse. The B power level is chosen such that the 8Tc mark run-length is written correctly. As in the case of FIG. 4A, the final preheat pulse of every mark run-length is omitted to permit rapid cooling of the trailing edge writing pulse. Finally, as shown in FIG. 8B, the reduced thermal interaction allows for a 50% of Tc duty cycle preheat pulse during every clock of all gap run-lengths.

Figure 10B:
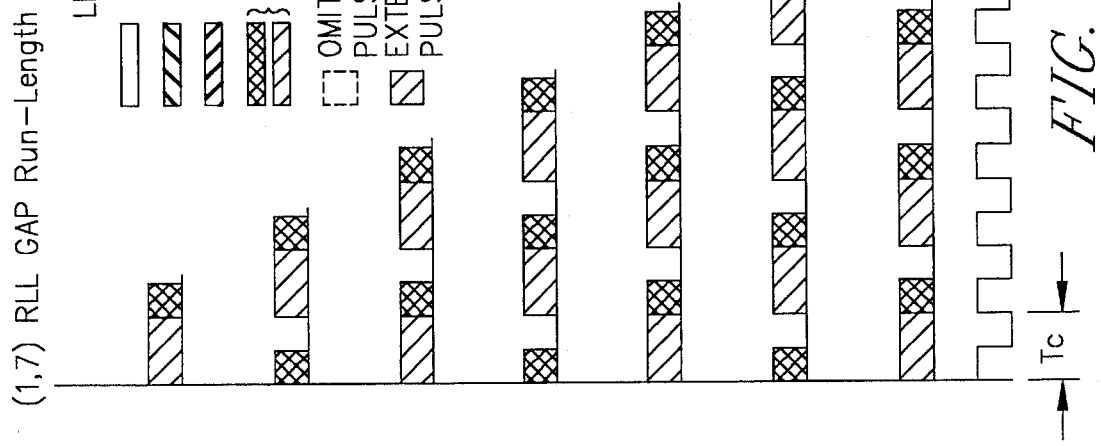
FIGS. 10A and 10B are schematic diagrams illustrating a preferred embodiment of the laser beam pulse sequences for each of the mark run lengths and gap run-lengths, respectively, allowed by the d,k constrained (1,7) RLL code applicable to light modulated DOW optical media.
Figure 10A:
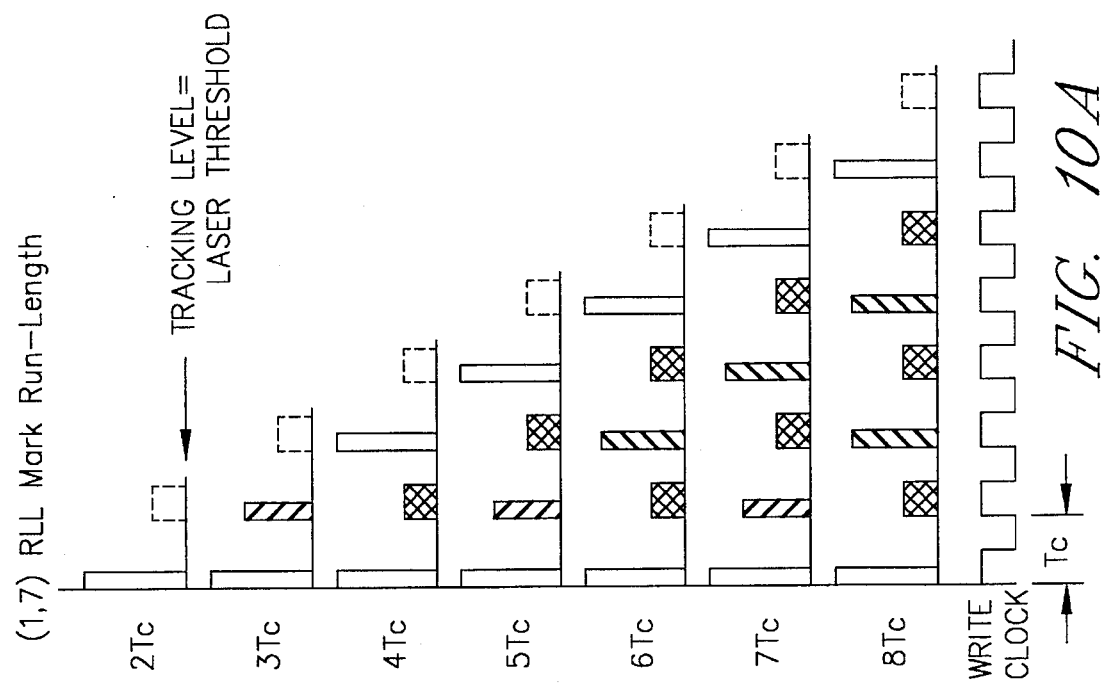
Figure 11:
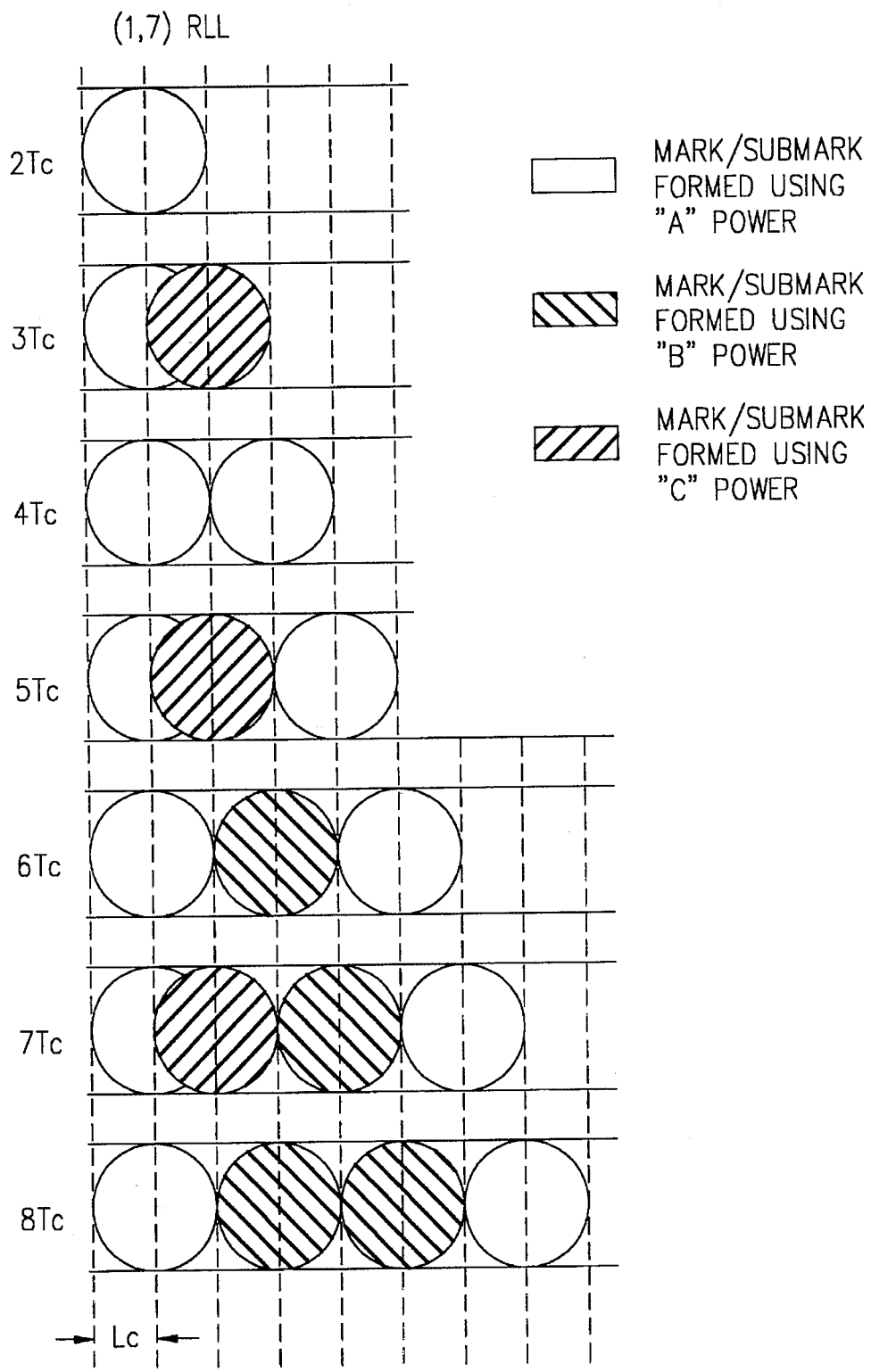
FIG. 11 is a schematic diagram illustrating the (1,7) mark run-lengths generated when the laser is pulsed as in FIG. 10A.

FIGS. 10A–10B and 11 illustrate a (1,7) RLL edge writing algorithm and the resulting mark/submark pattern on the optical media applicable to a light modulated DOW M-O type optical disk. During overwriting, this disk requires that the minimum media temperature of the data layer be high enough to ensure adequate erasure of previous data. Hence the P power level is selected to be considerably higher than that for the other types of optical media. To accomplish this, both the P power level and the duty cycle of the preheat pulses in the gap run-lengths are increased. As shown in FIG. 10B, during the final two clocks of all gap run-lengths the laser is pulsed at 100% and 50% of Tc, respectively. This pulse pattern is identical to the 2Tc gap run-length pattern. The 50% of Tc preheat pulse is used to control the cooling of the disk prior to the leading edge writing pulse, thereby increasing the thermal gradient and improving the writing of the leading edge mark/submark of the following mark run-length. Gap run-lengths greater than 2Tc require additional preheat pulses. For even gap run-lengths the preheat patterns are repeating blocks of the 2Tc gap run-length pattern. For odd gap run-lengths the first clock of the run-length is a 50% of Tc preheat pulse followed by the correct number of 2Tc gap run-length pattern preheat pulses. This leaves periodic cooling times of 0.5Tc in the gap run-lengths which limits the thermal buildup in the gaps. This limits side erasure and improves laser power margins by limiting the temperature excursion of the media during the gap run-lengths while still ensuring adequate on-track erasure. The process of serration by pulsed preheating causes the media temperature to oscillate between an upper and lower temperature during the gap run-length. By comparison, where there is no pulsed preheating in the gaps but rather an essentially constant preheat power level until just before writing the next mark (i.e., 100% duty cycle for all but the last clock in a gap run-length), the difference between these temperatures is much larger. Thus serration of the laser power by preheat pulsing results in a much smaller difference in media temperature between the start and stop of a gap run-length.

All mark run-lengths (FIG. 10A) are written the same as in FIG. 4A.

Operation of the Modulator and Laser Driver for Pulsed Preheating

Figure 12A:
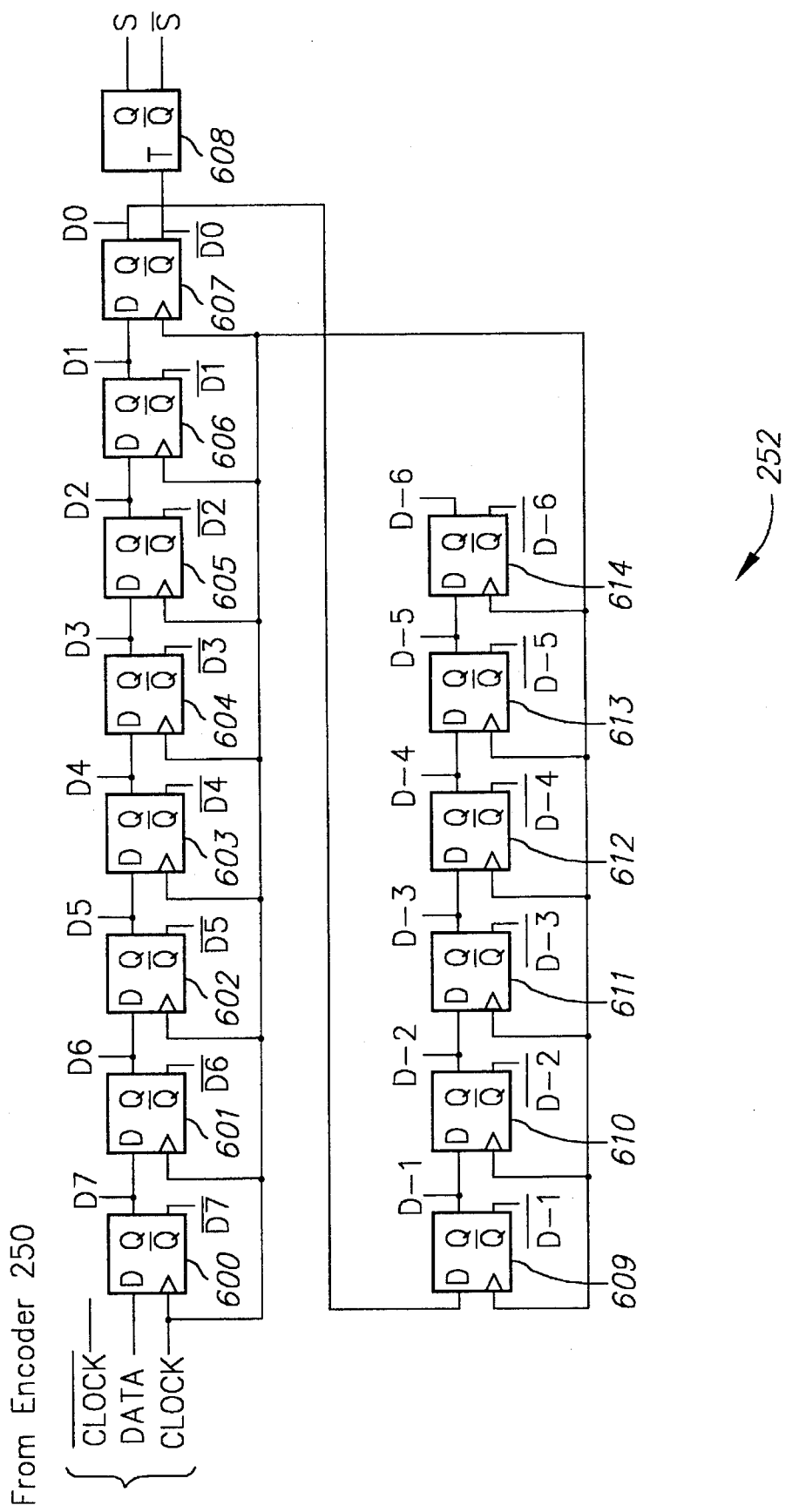
FIG. 12 is a circuit diagram of the laser driver modulator shown in FIG. 1.
Figure 12B:
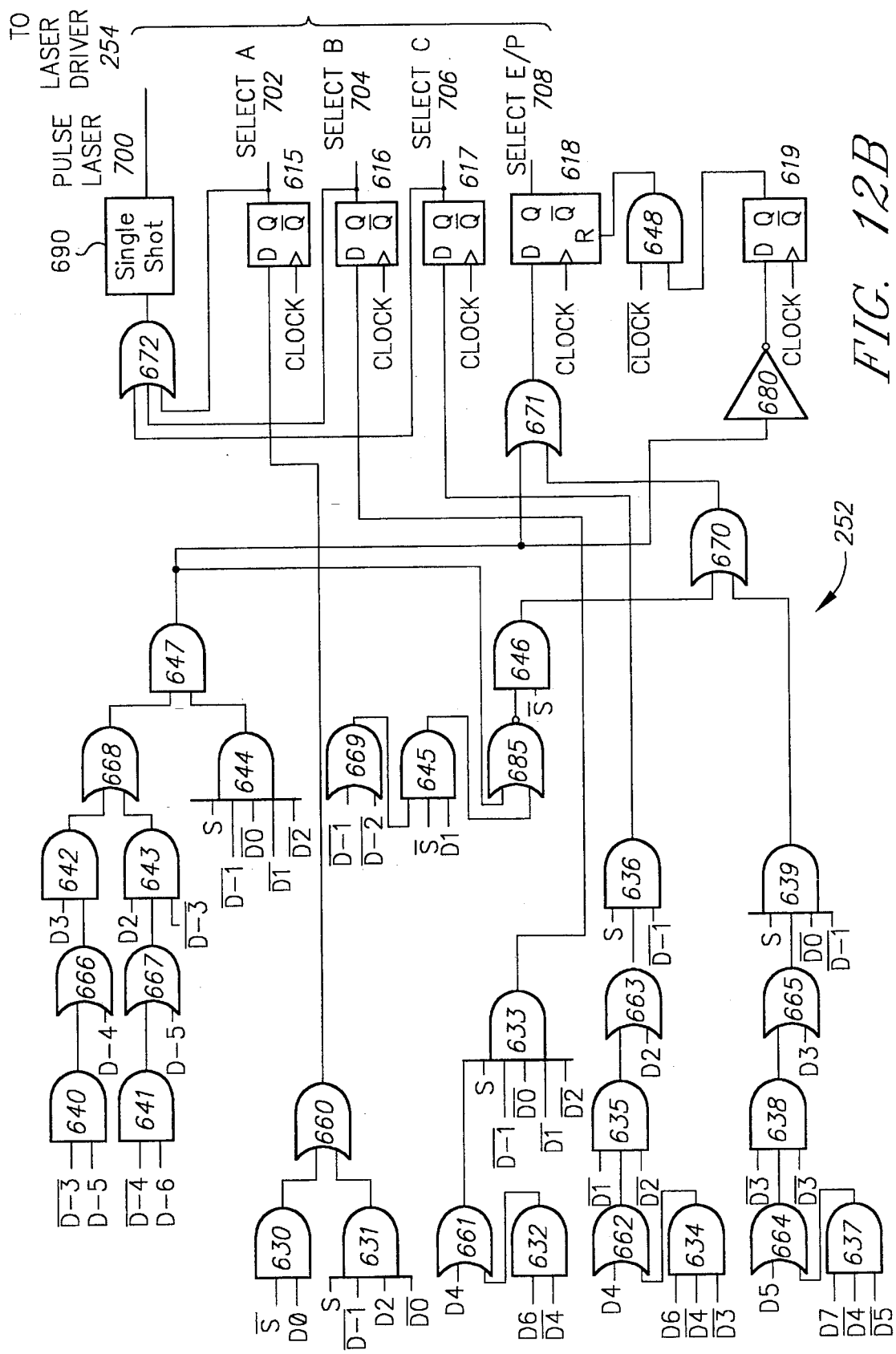

FIG. 12 is a circuit diagram of a preferred embodiment of the modulator 252 that implements the edge writing algorithm shown in FIGS. 4A–4B for a (1,7) RLL code. The logic circuitry is a state machine that detects the mark/gap run-lengths from PWM encoder 250 and pulses the laser accordingly through outputs to laser driver 254. Modulator 252 comprises a plurality of gates 630-680, flip-flops 600-619, and, a single-shot 690 and provides modulation signals for the laser at any of three distinct pulse writing power levels and a single preheat power level defined by the laser driver 254. Modulator 252 also generates the 0%, 50%, and 100% of Tc preheat pulse widths. Such state machine logic circuits are known in the art and are easily constructed for any particular edge-writing algorithm desired. Thus, while modulator 252 shown in FIG. 12 implements the edge writing patterns and pulsed preheating patterns in FIGS. 4A–4B, it is well known that other discrete logic circuits can also be manually implemented from a state machine by knowledge of the desired patterns and the inputs for the flip-flops 600–70673 614. Modulator 252 takes the data signal from encoder 250 and converts it into instructions to the laser driver 254 for writing the pattern, including the preheat pulse pattern, according to the present invention. The output of flip-flop 608 is either an S state (indicating a mark) or an S-BAR state (indicating a gap). Output lines 700–708 lead to the laser driver 254. Lines 702, 704, 706 select the power level A, B, or C while line 700 is raised for the duration of the actual write pulse. Line 708 selects a preheat power level and has duration of 0%, 50%, or, 100% of Tc. A preheat power level pulse at 100%Tc is designated as an E pulse in FIG. 12. Only one of the lines 702, 704, 706, or, 708 will be raised at a time and this informs the laser driver 254 which power level to use. The single shot 690 controls the duration of the laser pulse for writing pulses A, B and C, while the line 708 controls the duration of the preheat pulse P. The writing pulse duration should be as short as possible and is approximately 10–20 ns or less in the preferred embodiment. The writing pulse duration must be less than the clock period Tc at the outer track of the disk. This clock period Tc will depend upon the disk size and rotational speed and is approximately 35 ns at the disk innermost track in the preferred embodiment. Another advantage of short duration laser write pulses is that there is a reduction in "jitter." Jitter is a measure of the deviation of the mark transitions from their ideal locations.

Figure 13:
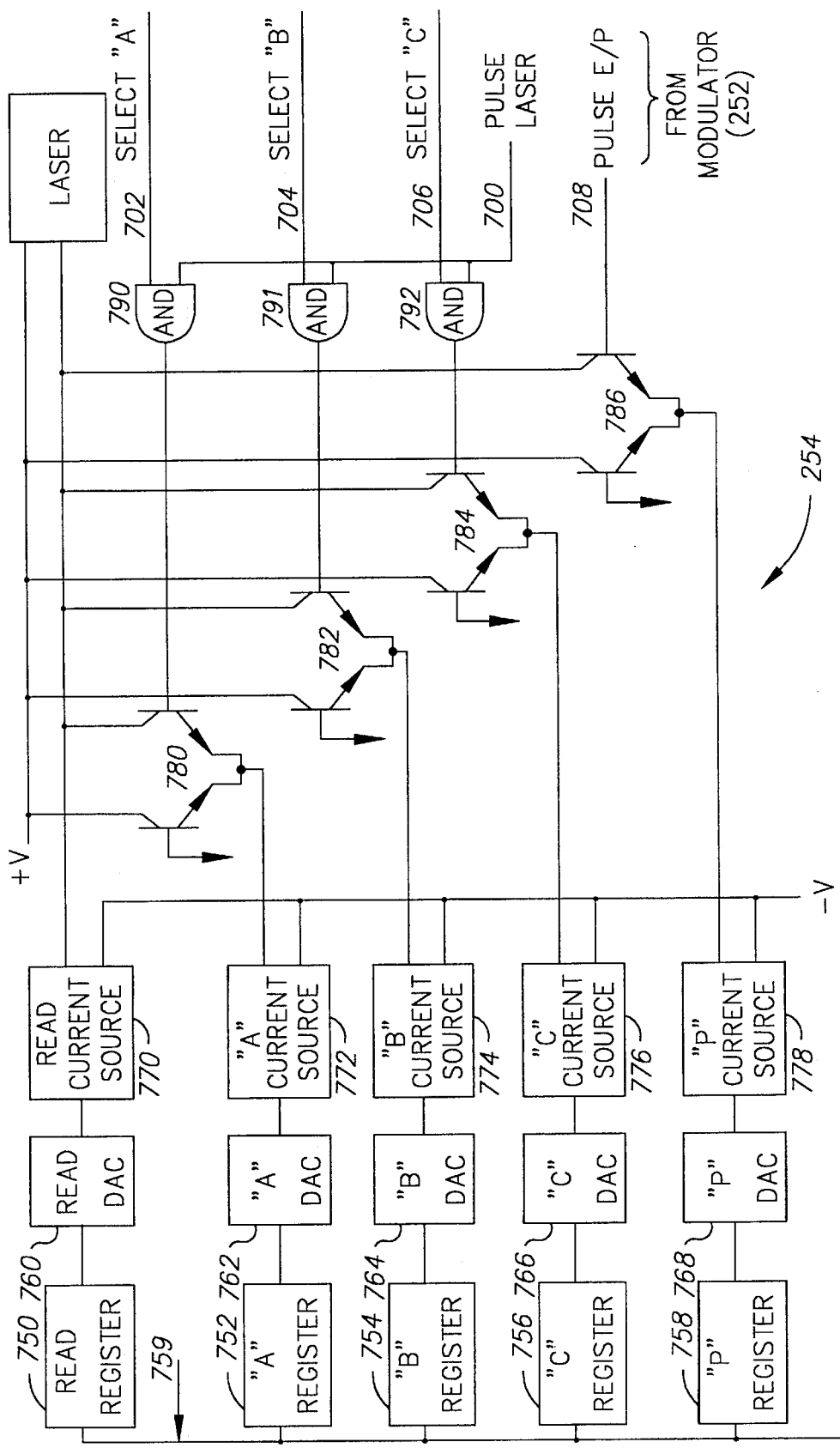
FIG. 13 is a circuit diagram of the laser driver shown in FIG. 1.

FIG. 13 is a circuit diagram illustrating the preferred embodiment of laser driver 254. Driver 254 comprises a plurality of registers 750–758, a plurality of digital to analog converters (DACs) 760–768, a plurality of current sources 770–778, and a plurality of transistor pairs 780–786. The disk drive controller 240 is connected to the registers 750–758 via a bus 759. Controller 240 sets the current level of each of the current sources 770–778 via their associated registers 750–758 and DACs 760–768. For example, when recorded data is to be read controller 240 sends a digital signal representing the appropriate read power level via bus 759 to register 750. Register 750 holds this digital value and provides it to DAC 760 which converts it to a corresponding analog signal which represents the appropriate current level to be supplied to read current source 770. The read current source 770 then is adjusted to the appropriate power level to supply to laser 150.

For the laser driver described above, the current sources 770–778 are adjusted to achieve the laser power level desired at the media. The read current source 770 provides enough current such that laser 150 does not heat the media above its Curie temperature. Write current sources 772, 774 and 776 for power levels A, B and C, respectively, are set in conjunction with preheat current source 778 for power level P such that the mark/gap run-lengths are written correctly according to the patterns described above. Lines 700, 702, 706 from modulator 252 are connected via AND gates 790, 791, 792 to transistor pairs 780, 782, and 784, respectively. These transistors allow additional current from the current sources 772, 774, 776, respectively, to flow to laser 150 when these lines are raised. Thus, laser 150 will be raised to the higher power levels A, B, and, C for the duration of single shot 690 (in modulator 252 in FIG. 12) for write pulses and power level P for the duration of the raised level of line 708 for preheat pulses as required to write the desired data pattern. In the preferred embodiment, with pulse duration of 15 ns or less, the power level A is approximately 20 mW at the media and power level P is approximately 2 mW at the media.

In operation, the read current source 770 is set to provide read current to laser 150 during read operations only; i.e. it is reduced to the laser threshold current for the duration of the write operation. Laser 150 is always either on at the read power level (during reading and when not reading or writing) or pulsing from the laser threshold level to power levels A, B, C and P (during writing). This ensures there is enough reflected light for correct focus and tracking servo operation.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. An optical disk drive comprising:

an optical disk having a data layer with tracks for the writing of data by the application of heat;

a laser for generating a light beam directed to the tracks on the disk to heat the data layer;

a motor for rotating the disk relative to the light beam;

a laser driver connected to the laser for pulsing the laser at a plurality of power levels above a threshold power level, one of said levels being a preheat power level less than the level required to write data in the tracks of the data layer;

a clock for generating timing signals with a characteristic cycle time;

a pulse width modulation data encoder operable in synchronization with the clock cycles and responsive to an input data stream for generating data patterns to be represented as marks made in the tracks of the data layer by the laser light beam and gaps located between the marks, a mark being comprised of a single submark or a series of contiguous or overlapping submarks, each submark being made by the light beam as a result of the laser being pulsed at one of the power levels above the preheat level;

a modulator connected to the laser driver and responsive to the data patterns from the data encoder for timing the pulsing of the laser at each of the power levels, the modulator including circuitry for timing the laser to pulse during the gaps between marks at the preheat power level and at different pulsing patterns, each preheat pulsing pattern being associated with a particular gap length.

2. The disk drive of claim 1 wherein the disk is a magneto-optic (M-O) disk.

3. The disk drive of claim 1 wherein the disk has at least two magnetically coupled magnetic layers and wherein the modulator circuitry for timing the laser preheat pulsing in the gaps generates a hundred percent duty cycle preheat pulse followed immediately by a fifty percent duty cycle preheat pulse in the last two gap clock cycles immediately preceding the writing of a submark.

4. The disk drive of claim 1 wherein each preheat pulsing pattern is associated with both the length of the mark just preceding the gap and the length of the gap.

5. The disk drive of claim 1 wherein the modulator circuitry for timing the laser preheat pulsing in the gaps generates a preheat pulsing pattern having preheat pulses of different time durations.

6. The disk drive of claim 1 wherein the modulator includes circuitry for timing the laser to pulse at the preheat power level between adjacent submarks.

7. The disk drive of claim 1 wherein the pulse width modulation data encoder is a run-length-limited (RLL) data encoder.

8. The disk drive of claim 7 wherein the RLL encoder is a 1,7 RLL encoder and wherein the modulator circuitry for timing the laser preheat pulsing in the gaps does not generate any preheat pulses during the last clock cycle for each mark run-length.

9. The disk drive of claim 7 wherein the RLL encoder is a 1,7 RLL encoder and wherein the modulator circuitry for timing the laser preheat pulsing in the gaps does not generate a preheat pulse during the last gap clock cycle for gap run-lengths equal to two clock cycles and three clock cycles.

10. The disk drive of claim 7 wherein the RLL encoder is a 2,7 RLL encoder and wherein the modulator circuitry for timing the laser preheat pulsing in the gaps does not generate any preheat pulses during the last two clock cycles for each mark run-length.

11. The disk drive of claim 7 wherein the RLL encoder is a 2,7 RLL encoder and wherein the modulator circuitry for timing the laser preheat pulsing in the gaps does not generate a preheat pulse during the last two gap clock cycles for the gap run-length equal to three clock cycles.

12. The disk drive of claim 1 wherein the disk is a phase change write-once read-many (WORM) disk and wherein the modulator circuitry for timing the laser preheat pulsing in the gaps generates one pulse per clock cycle during each gap run-length, each preheat pulse having the same time duration and being less than one clock cycle.

13. A magneto-optical disk drive comprising:
   a magneto-optical disk having a data layer with tracks for the writing of data by the application of heat;
   a laser for generating a light beam directed to the tracks on the disk to heat the data layer;
   a motor for rotating the disk relative to the light beam;
   a laser driver connected to the laser for pulsing the laser at a plurality of power levels above a threshold power level, one of said levels being a preheat power level less than the level required to write data in the tracks of the data layer;
   a clock for generating timing signals with a characteristic cycle time;
   a 1,7 run-length-limited (RLL) pulse width modulation data encoder operable in synchronization with the clock cycles and responsive to an input data stream for generating data patterns to be represented as marks made in the tracks of the data layer by the laser light beam and gaps located between the marks, a mark being comprised of a single submark or a series of contiguous or overlapping submarks, each submark being made by the light beam as a result of the laser being pulsed at one of the power levels above the preheat level;
   a modulator connected to the laser driver and responsive to the data patterns from the data encoder for timing the pulsing of the laser at each of the power levels, the modulator including circuitry for timing the laser to pulse at the preheat power level during the gaps between marks according to a plurality of preheat pulsing patterns, each preheat pulsing pattern being associated with a particular gap length; whereby the placement of the leading edge of the subsequent mark made after the gap is accurately positioned regardless of the length of the preceding gap.

14. The disk drive of claim 13 wherein the modulator circuitry for timing the laser preheat pulsing in the gaps does not generate a preheat pulse during the last gap clock cycle for gap run-lengths equal to two clock cycles and three clock cycles.

15. The disk drive of claim 13 wherein the plurality of preheat pulsing patterns includes a multiple number of preheat pulsing patterns associated with each gap length, each one of the multiple number being associated with a particular length of mark just preceding the gap.

16. The disk drive of claim 13 wherein the modulator circuitry for timing the laser preheat pulsing in the gaps generates preheat pulsing patterns having preheat pulses of different time durations.

17. The disk drive of claim 13 wherein the modulator includes circuitry for timing the laser to pulse at the preheat power level between adjacent submarks.

18. The disk drive of claim 13 wherein the modulator circuitry for timing the laser preheat pulsing in the gaps does not generate any preheat pulses during the last clock cycle for each mark run-length.

* * * * *